Patented Aug. 2, 1938

2,125,853

UNITED STATES PATENT OFFICE 2,125,853

SULPHUR MONOCHLORIDE-NITRILE REACTION PRODUCTS AND PROCESS OF PREPARING THEM

Anderson W. Ralston, Chicago, Ill., assignor to Armour and Company, Chicago, Ill., a corporation of Illinois No Drawing. Application December 21, 1936, Serial No. 117,094

17 Claims. (Cl. 260—17)

This invention relates to sulphided nitriles and processes of preparing the same and it comprises, as new materials, the product of reacting aliphatic nitriles containing 9 or more carbon atoms in the alkyl radical with sulphur monochloride, or with mixtures of free sulphur and sulphur monochloride; and it further comprises processes wherein such aliphatic nitriles are caused to react with sulphur monochloride or mixtures of sulphur or sulphur monochloride under conditions hereinafter described.

Aliphatic nitriles are compounds of increasing importance in the arts. This is particularly true in the case of those nitriles derived from, and corresponding to the higher fatty acids such as capric, lauric, myristic, palmitic, stearic, and the unsaturated higher fatty acids such as oleic, linoleic and linolenic. All of these higher fatty acid nitriles have the general formula RCN wherein R is an alkyl group having 9 or more carbon atoms. Thus, for example, stearonitrile can be prepared readily from stearic acid by the action of ammonia thereon in accordance with the Ralston U. S. Patent 2,061,314. The heptadecyl radical or alkyl group contains 17 carbon atoms and corresponds to the alkyl radical in stearic acid. All of these higher aliphatic nitriles can be prepared in accordance with the aforesaid patent, and various important uses have been developed for these materials. They can, for example, be cracked to give nitriles of lower molecular weight which are useful in many relations, and it can be said that the commercialization of the higher fatty acid nitriles has opened up new uses for these materials and new syntheses wherein the nitrile is one of the reagents.

I have now discovered that these nitriles of relatively high molecular weight can be reacted with sulphur monochloride, $S_2Cl_2$, to give chemical compounds of unknown composition but which have remarkable utility in many relations. I have, for example, discovered that these new materials are especially useful as lubricants either alone or in admixture with ordinary lubricating oils. I have claimed such lubricants in my co-pending application filed December 21, 1936, Serial No. 117,095.

For want of a better name I have designated my compounds as "sulphided" nitriles although this designation is probably inadequate to express the precise nature of my products since, in addition to containing sulphur, they also contain chlorine. Products of the present invention can also be prepared by reacting the nitriles with mixtures of free sulphur and sulphur chloride.

In broad aspects then, my invention comprises reacting sulphur monochloride or mixtures of free sulphur and sulphur monochloride with aliphatic nitriles in which the alkyl group contains at least 9 carbon atoms. Or, to put it another way, the nitrile as a whole contains at least 10 carbon atoms. I wish, however, to distinguish at this time from those processes wherein sulphur chloride and other chlorides such as aluminum chloride and phosphorus chloride are used as polymerizing agents. In the present invention I operate at temperatures which make the formation of polymeric substances unlikely. Although I am not prepared to state the course of the reaction, nor do I know the composition of the reaction products, I do know that the reaction product contains sulphur and chlorine and may possibly be some sort of addition product. My products are soluble in hydrocarbon oils and are rather oily, dark-colored liquids.

My sulphur monochloride-nitrile reaction products can be prepared from any aliphatic nitrile, either saturated or unsaturated, having at least 10 carbon atoms in the nitrile molecule. I find that for lubrication purposes those nitriles made from fatty acids having 16 or 18 carbon atoms are somewhat better than those of lower molecular weight, but the lower aliphatic nitriles, namely those from 10 to 14 carbon atoms can be used. Consequently, as starting materials, I can use nitriles prepared from capric, lauric, myristic, palmitic and stearic acids, also unsaturated fatty acids such as lard fatty acids, and various mixtures thereof.

For best results, I have discovered that the unsaturated fatty acid nitriles, when reacted with sulphur monochloride, give products which are superior to others for lubrication purposes. One of the best ultimate sources of my materials is crude soy bean fatty acids obtained from soy bean oil. These fatty acids are mixtures in which linoleic acid predominates to the extent of about 50%. Oleic acid is present to the extent of about 30 to 35% and the rest is linolenic, some saturated fatty acid and some impurities. Accordingly, I shall describe my specific examples with reference to this starting material.

In practicing my invention, the mixture of soy bean fatty acids described above is first converted to nitriles by the process of the above-mentioned patent, or in any other suitable way. I then charge a reaction vessel, advantageously provided with a reflux condenser, with about 200 parts by weight of the nitriles obtained from the soy bean fatty acids. Ordinary technical sulphur monochloride is then added slowly until about 20 parts by weight have been incorporated with the nitriles. During the addition of the sulphur monochloride the temperature rises from room temperature to about 50° to 60° C. I then allow the mixture to stand for a period of about twelve hours and, in order to insure completion of the reaction I finally heat the reaction mixture for about six hours at a temperature of about 60° C. I avoid high temperatures, above the boiling point of the sulphur monochloride, because such high temperatures tend to form hard pitch-like or gummy products. The reaction product is a dark-colored oily material containing both sulphur and chlorine, but it has no noticeable odor of chlorine or sulphur monochloride. The chlorine and sulphur appear to be firmly bound to the nitrile molecule since the reaction product can be washed with water without chlorine being liberated or the sulphur oxidizing. That the product is non-corrosive for metals is a further indication that both the sulphur and chlorine are in stable union with the nitrile.

I have indicated above that instead of using sulphur monochloride I can use a mixture of sulphur and sulphur monochloride. When proceeding with this modification I add about 20 parts by weight of flowers of sulphur to about 200 parts by weight of the crude soy bean fatty acid nitriles and then slowly add about 20 parts by weight of sulphur monochloride. In this modification I heat the reaction mixture at a temperature of about 60° C. for about six hours and finally increase the temperature to about 120° C. for a period of about thirty minutes. During the reaction most of the sulphur goes into solution and reacts with the nitrile. Any unreacted residual sulphur can be filtered off readily. The product appears to be similar to that made with the free sulphur, but its constitution has not been determined.

The amount of sulphur monochloride used should be such that enough is present so that all of the nitrile will react. My experiments indicate that a ratio of about 10 parts of nitrile to one part of sulphur monochloride satisfies this condition, but I do not wish to be restricted to these precise quantities since the lower molecular weight nitriles such as those obtained from lauric acid will require more. To be on the safe side, I can add an excess of sulphur monochloride and then free the reaction product of the excess by simple distillation, advantageously under a somewhat reduced pressure so that the sulphur monochloride which is in excess will distill about 100° to 125° C. The normal boiling point of sulphur monochloride is 138° C.

Curiously enough, sulphur dichloride will not react in the manner stated.

The temperatures can vary over rather wide limits as indicated. The reaction will proceed at room temperature but I find it desirable to heat the reaction mixture at a temperature of 60° to about 100° C. to insure completion.

Having thus described my invention, what I claim is:

1. The reaction product obtained by reacting sulphur monochloride with an aliphatic nitrile having the formula RCN wherein R is an alkyl radical containing at least 9 carbon atoms, at a temperature not exceeding 135° C.

2. The reaction product obtained by reacting sulphur monochloride with an aliphatic nitrile having the formula RCN wherein R is an alkyl radical containing 17 carbon atoms, at a temperature not exceeding 135° C.

3. The reaction product obtained by reacting sulphur monochloride with an unsaturated aliphatic nitrile having the formula RCN wherein R is an unsaturated alkyl radical having 17 carbon atoms, at a temperature not exceeding 135° C.

4. The reaction product obtained by reacting sulphur monochloride with soy bean fatty acid nitriles, at a temperature not exceeding 135° C.

5. The reaction product obtained by reacting sulphur monochloride and sulphur with an aliphatic nitrile having the formula RCN wherein R is an alkyl radical containing at least 9 carbon atoms, at a temperature not exceeding 135° C.

6. The reaction product obtained by reacting sulphur monochloride and sulphur with an aliphatic nitrile having the formula RCN wherein R is an alkyl radical containing 17 carbon atoms, at a temperature not exceeding 135° C.

7. The reaction product obtained by reacting sulphur monochloride and sulphur with an unsaturated aliphatic nitrile having the formula RCN wherein R is an unsaturated alkyl radical having 17 carbon atoms, at a temperature not exceeding 135° C.

8. The reaction product obtained by reacting sulphur monochloride and sulphur with soy bean fatty acid nitriles, at a temperature not exceeding 135° C.

9. The process which comprises reacting sulphur monochloride with an aliphatic nitrile having the formula RCN wherein R is an alkyl radical containing at least 9 carbon atoms, at a temperature not exceeding 135° C.

10. The process which comprises reacting sulphur monochloride with an aliphatic nitrile having the formula RCN wherein R is an alkyl radical containing 17 carbon atoms, at a temperature not exceeding 135° C.

11. The process which comprises reacting sulphur monochloride with an unsaturated aliphatic nitrile having the formula RCN where R is an unsaturated alkyl radical having 17 carbon atoms, at a temperature not exceeding 135° C.

12. The process which comprises reacting sulphur monochloride with soy bean fatty acid nitriles, at a temperature not exceeding 135° C.

13. The process which comprises reacting sulphur monochloride and sulphur with an aliphatic nitrile having the formula RCN wherein R is an alkyl radical containing at least 9 carbon atoms, at a temperature not exceeding 135° C.

14. The process which comprises reacting sulphur monochloride and sulphur with an aliphatic nitrile having the formula RCN wherein R is an alkyl radical containing 17 carbon atoms, at a temperature not exceeding 135° C.

15. The process which comprises reacting sulphur monochloride and sulphur with an unsaturated aliphatic nitrile having the formula RCN wherein R is an unsaturated alkyl radical having 17 carbon atoms, at a temperature not exceeding 135° C.

16. The process which comprises reacting sulphur monochloride and sulphur with soy bean fatty acid nitriles, at a temperature not exceeding 135° C.

17. The reaction product of sulphiding an aliphatic nitrile having the formula RCN wherein R is an alkyl radical containing at least 9 carbon atoms with a sulphiding reagent chosen from the group consisting of sulphur monochloride and mixtures of sulphur and sulphur monochloride at a temperature not exceeding 135° C.

ANDERSON W. RALSTON.